United States Patent [19]

Takuno

[11] Patent Number: 5,143,773
[45] Date of Patent: Sep. 1, 1992

[54] HIGHLY HYGROSCOPIC LAMINATE

[75] Inventor: Masami Takuno, Kawasaki, Japan

[73] Assignee: Showa Denko K.K., Tokyo, Japan

[21] Appl. No.: 676,485

[22] Filed: Mar. 28, 1991

[30] Foreign Application Priority Data

Mar. 29, 1990 [JP] Japan ................................ 2-81613

[51] Int. Cl.[5] .................... B32B 3/10; B32B 5/16; B32B 5/18; B32B 7/04
[52] U.S. Cl. ..................... 428/137; 428/138; 428/192; 428/194; 428/198; 428/280; 428/281; 428/282; 428/283; 428/286; 428/287; 428/311.5; 428/311.7; 428/317.6; 428/317.9
[58] Field of Search ............ 428/137, 138, 192, 194, 428/198, 280, 281, 282, 283, 286, 287, 311.5, 311.7, 316.6, 317.4

[56] References Cited

U.S. PATENT DOCUMENTS

| | | | |
|---|---|---|---|
| 4,645,698 | 2/1987 | Matsubara | 428/68 |
| 4,822,669 | 4/1989 | Roga | 428/284 |
| 4,823,783 | 4/1989 | Willhite, Jr. et al. | 428/284 |
| 4,824,718 | 4/1989 | Hwang | 428/284 |
| 4,888,231 | 12/1989 | Angstadt | 428/283 |
| 4,902,565 | 2/1990 | Brook | 428/284 |
| 5,055,332 | 10/1991 | Rhodes et al. | 428/283 |

Primary Examiner—William J. Van Balen
Attorney, Agent, or Firm—Sughrue, Mion, Zinn, Macpeak & Seas

[57] ABSTRACT

A hygroscopic laminate comprises a hygroscopic layer comprising a gas permeable film, and a water-absorbing polymer and at least one humectant selected from the group consisting of acetic acid, propionic acid, glycolic acid, lactic acid, hydracrylic acid, pyruvic acid and pyrrolidonecarboxylic acid and sodium, potassium, calcium and magnesium salts of these acids, which are wrapped in the gas permeable film; a porous non-water retention sheet; and a water impermeable sheet, the porous non-water retention sheet being disposed on one side of the hygroscopic layer and the water impermeable sheet being disposed on the other side of the hygroscopic layer, to thereby sandwich the hygroscopic layer. The hygroscopic laminate controls the relative humidity in a packaged system to 20 to 40%.

10 Claims, 1 Drawing Sheet

HIGHLY HYGROSCOPIC LAMINATE

BACKGROUND OF THE INVENTION

1. Field of the Invention

The present invention relates to a highly hygroscopic laminate for packaging works of art, fur pieces, tea, rice or the like, which are highly hygroscopic and whose commercial value is lowered when they absorb moisture, but if a desiccating agent or the like is used, they are damaged and correspondingly lose their commercial value. The above laminate makes it possible to maintain the relative humidity (RH) of these goods at 20 to 40% during the packaging of the same.

2. Description of the Related Art

When expensive articles such as works of art and objects of craft work are stored or transported, it is necessary to maintain a constant humidity within the environment surrounding these articles. As humidity controlling agents (desiccating agents) used for such purposes, there are known, for example, those comprising silica gel, alumina gel, zeolite and/or montmorillonite (see, for example, Japanese Unexamined Patent Publication (hereinafter referred to as "J.P. KOKAI") Nos. 46-1513, 49-1498 and 1-26731); or sheets which comprise a water-absorbing polymeric single substance sandwiched therebetween, for example, pulp sheets (see, for example, J. P. KOKAI Nos. 1-198346 and 1-153034).

Moreover, there has recently been marketed a humidity controlling sheet for silk fabrics which comprises glycerin as a humidity controlling agent, sandwiched between gas-permeable films (see Japanese Examined Patent Publication (hereinafter referred to as "J.P. KOKOKU") No. 1-12539.

The foregoing humidity controlling agents, however, have a poor responsitivity to a change in humidity, and it takes a long time for them to establish a humidity-equilibrium state, and when they absorb a large amount of moisture under a high humidity condition, the absorbed moisture comes into contact with the article to be subjected to humidity control whereby the article is badly damaged. Furthermore, they are generally packed in a bag of a fabric with coarse texture or paper and then put to practical use, and therefore, the places and methods for use of the same are limited and they are apt to be effective only locally.

Moreover, the sheets between which the water-absorbing polymer is sandwiched have an excellent water absorption power, but a poor moisture absorption power, and therefore, are not practically acceptable.

Accordingly, it is impossible to maintain a relatively low humidity (RH ranging from 20 to 40%), preferable for the foregoing articles such as works of art, within the environment surrounding the articles, when humidity controlling agents and, gas permeable films such as Japanese paper and water-absorbing polymers are independently employed as a single substance. Further, even if a combination of these materials, i.e., the foregoing humidity controlling agents (desiccating agents), Japanese paper or the like and the water-absorbing polymers, is adopted, the method of use and the sustaining of their desired functions are limited, and therefore, they cannot solve the foregoing problems.

Further, the sheet in which glycerin is used as a humidity controlling agent can control humidity in an environment or an article in the range of from 40 to 50% (RH), and correspondingly cannot control it in an RH range of from 20 to 40%, which is preferable for the foregoing articles.

SUMMARY OF THE INVENTION

The inventors of this invention have conducted intensive studies to obtain a hygroscopic sheet which permits the control of RH within a closed space at a range of from 20 to 40%, when in the space, and as a result, found that it is effective to use a substance having a high moisture retention ability even at a low temperature and low humidity, and which exhibits a moisture retention change due to variations of temperature, lower than those of glycerin and propylene glycol.

The present invention has been completed on the basis of the foregoing finding. Accordingly, the object of the present invention is to provide a highly hygroscopic laminate which permits an easy control of RH within a closed space at an RH of from 20 to 40% when in the space.

The foregoing object of the present invention can be effectively accomplished by providing a hygroscopic laminate which comprises a hygroscopic layer comprising a gas permeable film, and a water-absorbing polymer and at least one humectant selected from the group consisting of acetic acid, propionic acid, glycolic acid, lactic acid, hydracrylic acid, pyruvic acid and pyrrolidonecarboxylic acid and sodium, potassium, calcium and magnesium salts of these acids, which are wrapped in the gas permeable film; a porous non-water retention sheet; and a water impermeable sheet, the porous non-water retention sheet being disposed on one side of the hygroscopic layer and the water impermeable sheet being disposed on the other side of the hygroscopic layer, to thereby sandwich the hygroscopic layer.

The hygroscopic laminate of the present invention having the constitution defined above can control the RH within a closed space at an RH of from 20 to 40% if an article is packaged with the laminate in the closed space or contained therein together with the laminate.

DESCRIPTION OF THE PREFERRED EMBODIMENTS

Figure 1:
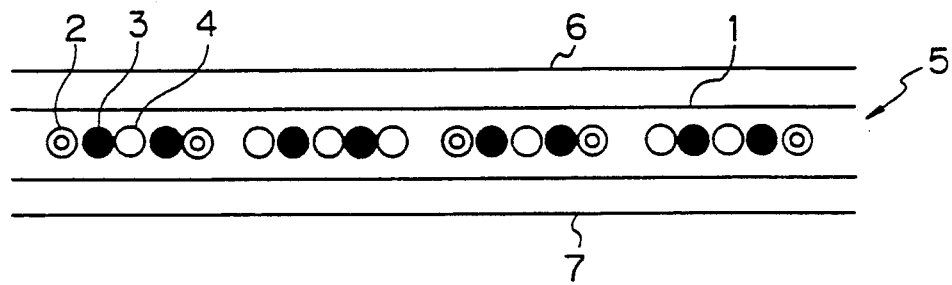
FIG. 1 is a cross sectional view illustrating an embodiment of the hygroscopic laminate according to the present invention.

As the water-absorbing polymers used in the present invention, there may be mentioned, for example, those obtained by graft-polymerizing a water-soluble polymerizable monomer or a polymerizable monomer which is made water-soluble through hydrolysis such as (meth)acrylic acid or (meth)acrylonitrile, or an oligomer or co-oligomer thereof with a polysaccharide such as a starch or a cellulose, optionally hydrolyzing the resulting graft polymer, and then three-dimensionally polymerizing the resulting hydrophilic polymer with a crosslinking agent; and those obtained by three-dimensionally polymerizing a hydrophilic polymer such as polyethylene oxide, sulfonated polyethylene or poly(meth)acrylic acid, with a crosslinking agent.

Some of the above are commercially available, for example, Prepare PX-402A (available from Showa Denko KK), Sanwet IM-300 (available from Sanyo Chemical Industries, Ltd.) and Aquakeep 10 SH (available from Sumitomo Seika KK).

Examples of the foregoing crosslinking agents include di- or tri-(meth)acrylates of polyols such as ethylene glycol, unsaturated polyesters obtained by reacting polyols with unsaturated acids such as maleic acid, allyl-modified starches and allyl-modified celluloses.

Examples of the substances which are generally used as a humectant include organic acid salts, polyhydric alcohols and water-soluble polymers which are liquids at ordinary temperature or are water-soluble and which are able to absorb moisture or have a function of absorbing moisture or water vapor in gas phases, and specific examples thereof include amino acids called NMF (natural moisture retention factor), sodium 2-pyrrolidone-5-carboxylate (PCA-Na), urea, uric acid, $NH_3$, glucosamine, creatine, citric acid salts, sodium lactate, salts of, for example, Na, K, Ca, Mg and $PO_4$, sugar, organic acids and peptides. Preferably, however, a carboxylic acid selected from the group consisting of acetic acid, propionic acid, glycolic acid, lactic acid, hydracrylic acid, pyruvic acid and pyrrolidonecarboxylic acid, or a carboxylic acid salt selected from the group consisting of sodium, potassium, calcium and magnesium salts of the foregoing carboxylic acids is used, from the viewpoint of the moisture absorbing ability required for controlling the RH to a low humidity range (20 to 40%) and thus to achieve the object of the present invention, and further, ensure safety. Sodium lactate and sodium pyrrolidonecarboxylate are especially preferred.

Such a humectant may further comprise an additive such as a hygroscopic amino acid or a salt of such an amino acid, in particular proline, lysine, glycerine, glutamic acid, tyrosine, phenylalanine or leucine, or an inorganic salt, for example, KOH, CaO, MgO, $BaCl_2.2H_2O$, $CaCl_2$. $6H_2O$, $Ca(NO_3)_2.4H_2O$, $CaSO_4.5H_2O$, $CrO_3$, $H_3PO_4.\frac{1}{2}H_2O$, $KHSO_4$, KI, $KNO_2$, $K_2CrO_4$, $K_2HPO_4$, $Mg(NO_3)_2.6H_2O$, $NH_4Cl$, $NH_4Cl/KNO_3$ mixture, $(NH_4)_2SO_4$, $NaClO_3$, $NaHSO_4.H_2O$, $NaNO_2$, $Na_2.12H_2O$ or $Na_2SO_4.10H_2O$. The addition of such an additive makes it possible to adjust the moisture absorbing speed of the resulting hygroscopic laminate.

These humectants are supported by a gas permeable film, as will be explained below, if in the powdery state, but are coated on such a° gas permeable film if in the liquid state, before practical use.

The term "non-water retention sheet" herein used means a sheet consisting of a material which does not substantially absorb water. For example, if the sheet consists of fibers, the moisture content of the fiber as determined at 20° C. and an RH of 65% should be not more than 5% and if the sheet consists of a film, the rate of water absorption as determined according to ASTM-D 570 should be not more than 5%.

Preferred examples of these non-water retention sheets are hydrophobic films which are uniformly perforated, such as polyethylene, polypropylene and polyester; and non-woven fabrics consisting of polyester fibers or polyolefin fibers or optionally the surface of the sheet may, if necessary, be subjected to a raising process or a flocking process, to impart a good touch to the sheet.

The "gas permeable film" herein used serves not only to transfer the moisture which permeates the laminate through the foregoing non-water retention sheet due to the moisture absorbing action of the laminate to the hygroscopic layer containing the water-absorbing polymer, and to simultaneously diffuse absorbed water in the horizontal direction to thus prevent the local accumulation of the absorbed water, but also to relax the influence of the expansion caused due to the moisture absorption of the hygroscopic layer. Therefore, those used in the present invention have a not less than 1 mm rise in water level due to the capillary phenomenon over 10 minutes, as determined according to JIS standard (Bireck method).

Examples of such gas permeable films are paper, non-woven fabrics, felt of cellulose fibers or a mixture thereof with other fibers or structures thereof formed into a coarse net. These substances are used for supporting the foregoing water-absorbing polymer and the humectant.

The water impermeable sheets in the laminate of the present invention are used for preventing the leakage of the absorbed moisture through the water impermeable sheet and a variety of films and sheets can be used for such purposes. If the water impermeable material is a film, it is in general a hydrophobic film, and if it is a sheet, any substances may be used as long as they are inherently water impermeable.

The laminate of the present invention must be laminated while the foregoing layers are integrated together, to prevent slippage between each neighboring layer. The foregoing layers may be integrated by, for example, embossing the laminate entirely or in a dot pattern, a linear pattern or a grid-like pattern at predetermined intervals, or further, by joining the layers with an adhesive.

Moreover, the highly hygroscopic laminate according to the present invention may advantageously be sealed at the periphery thereof to prevent water leakage through the side portions. The sealing of the laminate may be ensured by, for example, adhering the laminate with a separate sealing material or by sewing together. The adhesion may be performed by joining with an adhesive, contact bonding under heating, or welding.

If it is intended to impart antibacterial properties and/or mildew-proofing properties to the hygroscopic laminate for use in treating garments such as fur pieces, it is sufficient to add an antibacterial agent and/or a mildew-proofing agent to either the gas permeable film or the hygroscopic layer, or both thereof. The addition of such an antibacterial agent or a mildew-proofing agent may be in the form of powder or by immersing the film or layer in a solution containing the same and then drying, or further, by spraying such a solution on the film or layer and then drying. Examples of such antibacterial agents and mildew-proofing agents include benzalkonium chloride, benzethonium chloride and chlorhexidine.

As shown in FIG. 1, the highly hygroscopic laminate according to the present invention can be prepared by forming a water-absorbing layer 5 which comprises a gas permeable film 1 and a water-absorbing polymer 2, a humectant 3 and, as an optional component, a moth-proofing agent or a mildew-proofing agent 4 which are dispersed in the gas permeable film; disposing a porous non-water retention sheet 6 on the one side of the water-absorbing sheet 5 and a water impermeable sheet 7 on the other side thereof to thus sandwich the water-absorbing layer 5; and then heat-sealing the peripheral portions of the resulting laminate.

Figure 2:
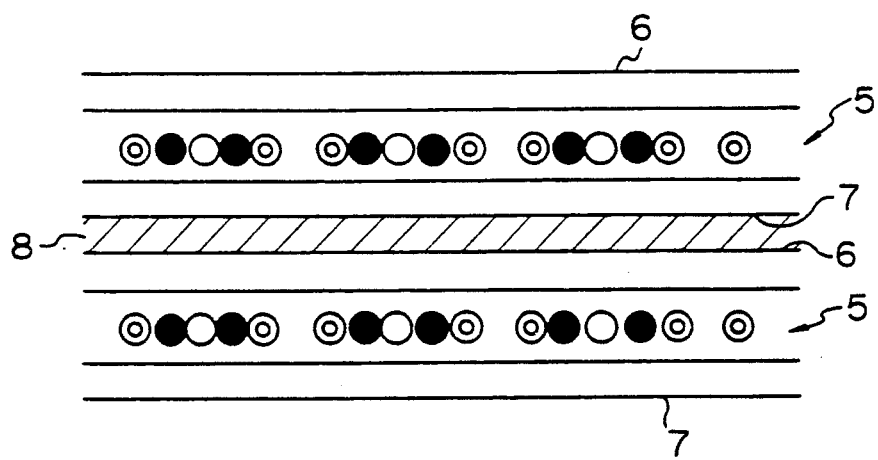
FIG. 2 is a cross sectional view of a multi-layered laminate product obtained by laminating a large number of the unitary hygroscopic laminates shown in FIG. 1.

Alternatively, as shown in FIG. 2, a plurality of the foregoing highly hygroscopic laminates may be put laminated in layers with a freely peelable adhesive 8 having a low adhesion, so that each porous non-water retention sheet 6 comes into contact with the water impermeable sheet 7, to obtain a multilayered laminate of the type from which each unitary laminate can be peeled off after the absorption of moisture to some extent from the top thereof, as will be encountered in the case of foot mats for bathrooms.

In this case, the unitary laminates may be peelably adhered by applying a low adhesion adhesive such as disclosed in J.P. KOKAI No. 63-254178 on the surface of the water impermeable sheet and/or porous non-water retention sheet and then laminating the layers as described above, or may be joined according to a method of contact-bonding under heating at the peripheral portions of the laminates.

The highly hygroscopic laminate according to the present invention makes it possible to effectively eliminate the adverse effect due to moisture on articles such as those which lose commercial value through an absorption of moisture or through excess drying, by controlling the RH within the packaged systems to from 20 to 40%. In addition, the laminate of the type in which a plurality of unitary layers are laminated exhibits an excellent effect not attained conventionally, from the economical and hygienic viewpoint, since a clean surface can be always obtained by peeling off the upper unitary laminate according to need.

The highly hygroscopic laminate of the present invention will be hereinafter explained in more detail with reference to the following Examples and Comparative Examples.

EXAMPLE 1

2 g of a commercially available water-absorbing polyacrylic acid polymer (trade name: Aqualic CA available from Nippon Shokubai Kagaku Kogyo Co., Ltd.) was dispersed in and sandwiched between two pulp sheets each having a size of 30×50 cm, and 10 g of sodium lactate (a solution of 70% concentration) as a humectant was coated on the pulp sheets for impregnating them to thus give a hygroscopic layer. Further, one side (the side of the contact surface) of the hygroscopic layer was covered with a non-water retention nonwoven fabric of a polypropylene (PP) while the other side thereof was covered with a polyethylene (PE) film, and finally, the resulting laminate was heat-sealed at the peripheral portions thereof to complete the same.

COMPARATIVE EXAMPLE 1

A sheet was prepared in the same manner used in Example 1 except that glycerin was substituted for the humectant used in Example 1.

COMPARATIVE EXAMPLE 2

The same procedures used in Example 1 were repeated except that the water-absorbing polymer was not employed as a sheet.

COMPARATIVE EXAMPLE 3

The same procedures used in Example 1 were repeated except that the humectant (sodium lactate) was not employed as a sheet.

The sheets thus obtained in Example 1 and Comparative Examples 1 to 3 were subjected to a moisture absorption test in a closed container in which the relative humidity was variously changed.

Each of the foregoing four kinds of sheets was suspended in a thermohygrostat having an internal volume of 100 l which had been controlled to an RH of 10%, 20%, 40% or 80%, allowed to stand for 3 days in the thermohygrostat, and then the increase in the weight of the sheet was determined to evaluate the moisture absorbing speed thereof.

The results thus obtained are summarized in the following Table 1.

TABLE 1

| | Moisture Absorbing Speed (g/m$^2$/day) | | | |
|---|---|---|---|---|
| | RH = 10% | RH = 20% | RH = 40% | RH = 80% |
| Example 1 | −0.3 | 0.1 | 25 | 80 |
| Comparative Example 1 | −1.5 | −1.0 | −0.5 | 18 |
| Comparative Example 2 | −0.5 | −0.5 | 2 | 15 |
| Comparative Example 3 | 0 | 0 | 0 | 3 |

As seen from the results listed in Table 1, when a combination of a water-absorbing polymer and a humectant was employed in the hygroscopic laminates, the moisture absorption power of the hygroscopic laminate in which sodium lactate was used as a humectant (Example 1) was greater than that for the sheet in which glycerin was used as a humectant (Comparative Example 1), and the former absorbed moisture even in an atmosphere having an RH of 20%.

Moreover, it is found that the moisture absorption power of the laminates was improved if a water-absorbing polymer and a humectant were used in combination.

EXAMPLE 2

9 g of a water-absorbing polymer was sandwiched between two pulp sheets each having a size of 100×150 cm, a solution obtained by mixing 23 g of a 80% aqueous solution of sodium pyrrolidonecarboxylate with 0.6 g of an amino acid (proline) was uniformly coated on the pulp sheets, and then both sides of the resulting assembly were covered with the same films in the same manner used in Example 1 to thus give a sheet for storing a material for tatami facing (made of rushes).

COMPARATIVE EXAMPLE 4

In the rainy season, the rushes as the material for the tatami facing absorbs moisture become a cause of the proliferation of mold, and thus the commercial value of the material is greatly impaired. Therefore, a variety of measures have been taken during the rainy season. For example, the tatami facing is transferred to the upper store to store the same, the entire storehouse for storing the tatami facing is dehumidified, or the material is contained in a bag of a laminate having a PE/Nylon structure.

A storability test of the tatami facing was performed using the packaging material prepared in Example 2.

The rushes from Yatsushiro (in Kumamoto Prefecture) were formed into the tatami facing. 10 Sheets (wound into a roll; weight=15 kg; moisture content=15%) were wrapped with the packaging material obtained in Example 2, and both ends of the package were tied with a string to closely seal the package. On the other hand, in the conventional method (in which the laminate or packaging material obtained in Example 2 was not used), 10 sheets of the tatami facing were likewise introduced into a bag of PE/Nylon, and both ends thereof were likewise tied with a string to closely seal the same. These packages were stored in a thermohygrostat for 3 months under the conditions (at 30° C., RH=80%) similar to those encountered during the rainy season.

After the storage, the moisture within each package and the quality of the tatami facing were evaluated.

The results are summarized in the following Table 2.

TABLE 2

|  | Condition of the Rushes | Condition in the Package | RH (%) within the Package |
| --- | --- | --- | --- |
| Example 2 | no change (blueish green) | no change | 25 |
| Comparative Example 4 | browning, giving out bad smell | dewing, proliferation of mold | 100 |

As seen from Table 2, the tatami facing packaged with the laminate of the present invention could be stored under a low moisture condition such that the moisture within the package was controlled to an RH of 25%, and thus a good quality thereof was maintained, but the moisture within the package in which the laminate of the invention was not used was high on the order of 100% RH, and as a result, dewing and a proliferation of mold were observed and the commercial value of the tatami facing was greatly impaired.

EXAMPLE 3

20 g of the foregoing water-absorbing polymer and 0.5 g of a mixture comprising 95% by weight of sodium lactate and 5% by weight of proline were uniformly dispersed in and sandwiched between two pulp sheets each having a size of 50×70 cm, to give a hygroscopic layer and further the layer was impregnated with 0.1 g of benzalkonium chloride as an antibacterial agent. One (on the side of the contact surface) of the sides of the hygroscopic layer was covered with a non-water retention nonwoven fabric of PP/PE and the other side (on the non-contact side) thereof was covered with a PE film (a water impermeable film), and the resulting assembly was heat-sealed at the peripheral portions thereof to complete a laminate. 24 sheets of the resulting laminate were laid in layers so that the PE film came into contact with the non-water retention nonwoven fabric of PP/PE through a thin layer of an adhesive, which was an alkyl acrylate type peelable and re-adherable adhesive substance (available from Sekisui Chemical Co., Ltd.) and which had recently been used in paper for writing memos, to give a multilayered laminate (having a thickness of 5 mm). The resulting multilayered laminate was used as a foot mat for bath rooms.

COMPARATIVE EXAMPLE 5

A conventional cotton mat (bulky towel) and the mat obtained from the laminate of Example 3 were alternatively used on one-day shifts, for comparing these two mats.

The results are listed in the following Table 3.

TABLE 3

|  | Water Absorption Power | Moisture Absorption Power | Conditions during Use | | |
| --- | --- | --- | --- | --- | --- |
|  |  |  | Hygienic | Method of Reuse | Functions Other than Foot Mat |
| Example 3 | strong | Yes | good | peeling off the used part | moisture removal bathroom |
| Comparative | weak | No | bad | washing needed | none |
| Example 5 |  |  |  |  |  |

As seen from Table 3, when the multilayered laminate was used as a foot mat for bathrooms, the laminate was excellent compared with the conventional cotton mat (bulky towel). For example, the laminate was hygienic, the method of reuse was easy and simply comprised peeling off the used unitary laminate to expose another non-used unitary laminate, and the removal of moisture in the bathroom also could be attained.

EXAMPLE 4

The kinds of films used in the following tests, test charts and conditions for image processing are shown in the following Table 4.

TABLE 4

| Item | Content |
| --- | --- |
| Kind of Film Used | three kinds of films, i.e., reversal, negative and positive films |
| Test Chart | proper photographing of portraits for visual evaluation |
| Conditions for Photographing the Test Chart | photographing was performed at the standard color temperature and under light rays from a tungsten lamp |
| Conditions for Development Processing | each film was developed under the specified standard conditions |

On the entire internal surface of a presently used container (made of stainless steel) for the safekeeping of films, there was adhered, through a double sided adhesive tape, a sheet obtained by mixing an acrylic water-absorbing polymer (in an amount corresponding to 120 g/m$^2$), glycolic acid (in an amount corresponding to 120 g/m$^2$) and MgO (in an amount corresponding to 20 g/m$^2$), uniformly coating the resulting mixture on the surface of a pulp sheet and then covering the surface of the coated pulp sheet with a gas permeable film (a nonwoven fabric) of PP/PE to thus give a closed container in which moisture in the space was adjusted to an RH on the order of 35%. Three such closed containers were produced, and each of the foregoing films was introduced into each container to obtain samples for the safekeeping of films.

COMPARATIVE EXAMPLE 6

The samples for the safekeeping of film prepared in Example 4 and a conventional sample for the safekeeping in which a presently used container for safekeeping was employed were subjected to the following test, which was performed under the following accelerated conditions for the safekeeping including the difference between humidities while assuming the occurrence of color fading in the dark.

This test was carried out by allowing the samples to stand in a thermostatic chamber maintained at 40° C. for 3 years and then evaluating the humidity within the packages and the conditions of the stored films after storage.

These films were evaluated by determining the density change in the 11-step gray scale with a Macbeth densitometer, and by visually observing and evaluating the picture obtained by taking portraits.

The results are summarized in the following Table 5.

TABLE 5

|  | Kind | Density Change | Visual Evaluation of Portrait | Moisture Within the Container |
| --- | --- | --- | --- | --- |
| Example 4 | reversal | 0.17 | good | RH = 34% |
|  | negative | 0.11 | good | RH = 36% |
|  | positive | 0.14 | good | RH = 36% |
| Comparative | reversal | 0.21 | good | RH = 60% |
| Example 6 | negative | 0.38 | poor | RH = 65% |
|  | positive | 0.53 | bad | RH = 61% |

As seen from the results listed in Table 5, the results observed for the films which were stored while the relative humidity within the container was adjusted to about 35% using the method of safekeeping according to the present invention were good in all items tested, irrespective of the kinds of the films. On the other hand, the commercial value of the films which were stored according to the presently used method for safekeeping was impaired. For example, the reproduction of images was impaired depending on the kind of the film.

I claim:

1. A hygroscopic laminate comprising a hygroscopic layer which comprises a gas permeable film, and a water-absorbing polymer and at least one humectant selected from the group consisting of acetic acid, propionic acid, glycolic acid, lactic acid, hydracrylic acid, pyruvic acid and pyrrolidonecarboxylic acid and sodium, potassium, calcium and magnesium salts of these acids, which are wrapped in the gas permeable film; a porous non-water retention sheet; and a water impermeable sheet, the porous non-water retention sheet being disposed on one side of the hygroscopic layer and the water impermeable sheet being disposed on the other side of the hygroscopic layer, to thereby sandwich the hygroscopic layer.

2. A hygroscopic laminate as set forth in claim 1, wherein the water-absorbing polymer is selected from those obtained by three-dimensionally polymerizing a hydrophilic polymer with a crosslinking agent.

3. A hygroscopic laminate as set forth in claim 2, wherein the hydrophilic polymer is selected from those obtained by graft-polymerizing a water-soluble polymerizable monomer or a polymerizable monomer which is made water-soluble through hydrolysis with a polysaccharide, and optionally hydrolyzing the resulting graft polymer, and polyethylene oxide, sulfonated polyethylene, polyacrylic acid and polymethacrylic acid.

4. A hygroscopic laminate as set forth in claim 1, wherein an additive selected from hygroscopic amino acids and salts thereof and inorganic salts is added to the humectant.

5. A hygroscopic laminate as set forth in claim 1, wherein the humectant is selected from sodium lactate and sodium pyrrolidonecarboxylate.

6. A hygroscopic laminate as set forth in claim 1, wherein the porous non-water retention sheet is selected from uniformly perforated polyethylene, polypropylene and polyester films and non-woven polyester and polyolefin fabrics.

7. A hygroscopic laminate as set forth in claim 1, wherein the gas permeable film is selected from paper, non-woven fabrics, felt and coarse net structures of cellulose fibers or a mixture thereof with another fiber.

8. A hygroscopic laminate as set forth in claim 1, which is sealed at the periphery to prevent water leakage through the side portions.

9. A hygroscopic laminate as set forth in claim 1, wherein the gas permeable film and/or the hygroscopic layer comprise an antibacterial or mildew-proofing agent.

10. A hygroscopic laminate as set forth in claim 1, which controls the relative humidity in a packaged system to 20 to 40%.

* * * * *